Patented Jan. 1, 1946

2,391,920

UNITED STATES PATENT OFFICE 2,391,920

POLYMERIZATION CATALYSTS

Merlin D. Peterson, Wilmington, Del., assignor to E. I. du Pont de Nemours & Company, Wilmington, Del., a corporation of Delaware No Drawing. Application November 16, 1942, Serial No. 465,795

9 Claims. (Cl. 260—84)

This invention relates to chemical processes and more particularly to improvements in the catalytic polymerization of organic compounds.

It is known that ethylenic compounds can be polymerized with the aid of catalysts of the active oxygen or peroxide type, for example, benzoyl peroxide or the salts of persulfuric acid. These commonly used catalysts have many shortcomings, e. g., limited temperature range of operability (0° C. to about 110° C.) and restricted utility in the polymerization of ethylenic compounds requiring higher polymerization temperatures.

This invention accordingly has as an object to provide a new and improved method for polymerizing organic compounds containing at least one polymer producing unsaturated linkage. A further object is the utilizatoin of a novel type of catalyst for the polymerization of organic compounds containing ethylenic unsaturation. A still further object is to provide a polymerization process which is free from the restrictions characterizing polymerization processes involving catalysts of the active oxygen type. Other objects will appear hereinafter.

The above and other objects described hereinafter are accomplished by conducting the polymerization of the organic compound containing at least one polymer producing unsaturated linkage in the presence of catalytic amounts of a dialkyl dioxide.

By "organic compound containing ethylenic unsaturation" is meant compounds containing the =C=C= linkage.

By "dialkyl dioxide" is meant dialkyl derivatives of hydrogen peroxide corresponding to the formula ROOR', wherein R and R' are the same or different simple unsubstituted alkyl groups such as methyl, ethyl, propyl, etc. Examples of such dialkyl dioxides are dimethyl dioxide, diethyl dioxide, dipropyl dioxide, propyl ethyl dioxide, propyl methyl dioxide, and the like.

The dialkyl dioxides are prepared by reacting hydrogen peroxide in the presence of alkali with the appropriate dialkyl sulfate at 30° to 100° C. These compounds are not to be confused with the ether peroxides which result from the action of air and light on dialkyl ethers and which in some instances have been referred to erroneously as dialkyl dioxides. The true dialkyl dioxides are distinguished from the monoalkyl and acyl derivatives of hydrogen peroxide in being much more chemically inert than the latter compounds and giving a negative test for active oxygen.

The polymerization of organic compounds containing at least one unsaturated polymer producing linkage with dialkyl dioxides can be carried out either as a batch, semi-continuous, or continuous operation, in which a suitable reaction vessel is charged with the catalyst and the compound or compounds which it is desired to polymerize, and the mixture heated either under autogenous pressure or under superatmospheric pressure until the desired degree of polymerization has been attained. Generally, the polymerization is conducted in vessels which are either constructed of or lined with glass, stainless steel, silver, copper, aluminum, mild steel, etc.

The polymerization can be carried out in a medium which may consist wholly of water, which may contain water in substantial amount, or which may consist solely of an organic solvent. If desired, however, the reaction can be carried out in the absence of solvents or diluents.

As a rule the amount of catalyst will vary from about 0.001% to about 5%, on the total weight of materials charged into the reaction vessel. It is generally preferred to use as low an amount of catalyst as possible and the range which has been found satisfactory is from 0.01% to 1%, on the total weight of materials charged into the reactor.

In polymerizations in aqueous systems, it is advisable to use dispersing or surface active agents to maintain an emulsified state. The pH of the system is not a critical factor for operativeness. In some instances, however, it is desirable to operate under selected pH conditions in order to obtain optimum results from the standpoint of yields and polymer quality.

In batch operations more of the ethylenic compound being polymerized can be introduced as the reaction proceeds to maintain the pressure in the system in the range desired.

The dialkyl dioxides of this invention are superior to other commonly used catalysts for the bulk, solution, and emulsion polymerizations of such vinyl compounds as vinyl thiolacetate and for catalyzing its polymerization with other polymerizable organic compounds having ethylenic unsaturation. The solution polymerization of vinyl thiolacetate with dialkyl dioxides and particularly diethyl dioxide, can be accomplished in the presence of such solvents as benzene, dioxan, ethyl acetate and tertiary butyl alcohol.

The examples which follow are submitted to illustrate and not to limit this invention. Unless otherwise stated parts are by weight.

Example I

A stainless steel pressure reactor is flushed with oxygen-free nitrogen and charged with 100 parts of deaerated, distilled water and 0.4 part of diethyl dioxide. After removal of the nitrogen by evacuation, the reactor is charged with ethylene to a pressure of 300 atmospheres and heated to 150° C. Upon reaching this temperature the ethylene pressure is raised to between 900 and 1000 atmospheres, the vessel agitated and the polymerization allowed to proceed under these conditions for 8 hours. The total pressure drop during this time is about 400 atmospheres. The reactor is cooled, the excess ethylene bled off, and the vessel then opened. There is thus obtained 34 parts of a white, solid, polymer having a melting point of 110° to 115° C., and an intrinsic viscosity of 0.76 (measured as a 0.125% solution in xylene at 85° C.), which corresponds to a molecular weight of about 15,200. The polymer has a tensile strength of 1800 lbs./sq. in., as measured on a hot pressed film prepared at 135° C. and 8000 lbs./sq. in. pressure. The polymer is soluble to an extent of about 20% by weight in hot xylene and from such solutions transparent films can be cast. Strips of hot pressed film can be elongated about 600 to 700% by cold drawing.

Duplication of the above experiment using benzoyl peroxide in place of the diethyl dioxide yields 4.9 parts of a light tan, brittle, wax having a molecular weight of about 915 (ebullioscopic method).

Example II

A stainless steel lined pressure reaction vessel is swept with nitrogen and then charged with 100 parts of deaerated distilled water, 1 part of borax, and 0.4 parts of diethyl dioxide. This charge, which has a pH of 9.2 occupies about 25% of the total space in the reactor. The reactor is closed, ethylene is admitted to a pressure of about 1000 atmospheres, and the vessel heated to 130° C. with agitation. At the end of 8.5 hours the vessel is allowed to cool, the excess ethylene bled off, and the vessel opened. During this time the pressure is maintained at the indicated value by periodically repressuring with ethylene. There results 49 parts of a white solid ethylene polymer having an extrusion rate of 0.20 grams per minute at 190° C. under 25 lbs. nitrogen pressure from an orifice $\frac{1}{16}''$ in diameter and $\frac{1}{8}''$ in length. The tensile strength of the polymer is 2020 lbs./sq. in. The polymer is soluble to the extent of about 20% in refluxing xylene and a hot pressed film thereof has an elongation of about 450%.

Example III

A solution of 45 parts of vinyl acetate in 60 parts of isooctane is placed in a stainless steel reaction vessel together with 0.5 part of diethyl dioxide. After closure, the air is removed by evacuation and ethylene is forced in to a pressure of about 600 atmospheres and the vessel gradually heated to 150° C. with agitation. The ethylene pressure is adjusted to between 900 and 1000 atmospheres and maintained in this range for 8 hours. The vessel is then cooled and the contents discharged. From the reaction mixture there is recovered 52 parts of a hard wax-like ethylene/vinyl acetate polymer having an intrinsic viscosity of 0.24 (measured as a 0.125% solution in xylene at 85° C.). The product analyzes 77.2% carbon, from which it may be calculated that the ethylene/vinyl acetate mole ratio is 7.8 to 1.

Example IV

One hundred parts of methyl methacrylate is subjected to high pressure polymerization with ethylene in the manner described in Example III, 100 parts of isooctane being used as the reaction medium and 0.25 part of diethyl dioxide as the catalyst. This charge is maintained with agitation at 150° to 200° C. under an ethylene pressure of 900 to 1000 atmospheres for 8 hours. From the reaction mixture there is obtained 101 parts of an ethylene/methyl methacrylate polymer having an intrinsic viscosity of 0.24 (measured as a 0.125% solution in xylene at 85° C.). The product analyzes 63% carbon, from which it may be calculated that the ethylene/methyl methacrylate mole ratio is 0.47 to 1.

Example V

A high pressure stainless steel reaction vessel is charged with 50 parts of vinyl acetate, 100 parts of water and 0.2 part of diethyl dioxide. The vessel is chilled to approximately −80° C. and 25 parts of tetrafluoroethylene is admitted. The vessel is closed and heated to 130° C. where it is maintained for 6 hours. The vessel is cooled to room temperature and excess gaseous reactants are allowed to bleed off. From the reaction mixture there is isolated 44 parts of a polymer melting at 110° C. The product analyzes 10.9% fluorine, from which the mole ratio of vinyl acetate/tetrafluoroethylene is calculated to be 7 to 1. The carbon content of the product is 51.1%. The polymer has a tensile strength of 4,300 lbs./sq.in. and an elongation of 106%.

Example VI

A stainless steel pressure vessel is charged with 100 parts of deoxygenated vinyl methyl ether and 0.2 part of diethyl dioxide, care being taken to exclude atmospheric oxygen by conducting the loading operation under a blanket of pure nitrogen. The reaction vessel is closed and heated to 130° C. where it is held with agitation for 16 hours. Upon cooling to room temperature there is obtained 75 parts of a syrupy polymeric vinyl methyl ether having a molecular weight of 1700 (as determined ebullioscopically in benzene).

Example VII

A glass pressure vessel is charged with 50 parts of pure styrene and 0.25 part of diethyl dioxide under a blanket of nitrogen to exclude atmospheric oxygen. The vessel is closed and heated at 95° C. for 23 hours, followed by a heating period of 1½ hours at 150° to 180° C. In this way a polystyrene having a molecular weight of approximately 42,000 is obtained in quantitative yield.

Example VIII

A silver lined high pressure reaction vessel is swept free from atmospheric oxygen with pure nitrogen and is charged with 100 parts of distilled deoxygenated water, 0.5 part of diethyl dioxide and 2 parts of borax. The vessel is closed and charged with ethylene to a pressure of 450 atmospheres, and then carbon monoxide is added until the total pressure is 500 atmosphere. The charged reactor is heated with agitation at 132° to 153° C. for 8.5 hours, during which time the pressure is maintained at 840 to 915 atmospheres by periodically repressuring with ethylene. The total observed pressure drop is 215 atmospheres. At the end of the reaction period the reactor is cooled and the unreacted gases bled off. Upon opening the reactor there is found 22.1 parts of a white, wax-like polymer of ethylene and carbon monoxide. This is isolated by filtering from the aqueous phase. This polymer, after washing and drying, melts at 88° to 90° C. and has an ethylene/carbon monoxide mole ratio of 3.3 to 1. Its intrinsic viscosity is 0.15 (measured as a 0.125° solution in meta-cresol at 25° C.).

*Example IX*

A silver lined reaction vessel is charged with 50 parts of distilled, deoxygenated water, 50 parts of trioxane (alpha-trioxymethylene), 0.5 part of diethyl dioxide, and 0.2 part of sulfuric acid. The vessel is closed and charged with ethylene to a pressure of 300 atmospheres. The vessel is then slowly heated to between 148° and 164° C. with agitation. At this temperature the ethylene pressure is adjusted to 910 atmospheres and held in the range of 920 to 980 atmospheres for 9.75 hours. During this period a total pressure drop of 60 atmospheres is observed. The ethylene pressure is maintained in the indicated range throughout the period of reaction by repressuring with ethylene. Upon completion of the reaction the vessel is cooled and the unreacted gases bled off. From the reaction mixture there is obtained a white granular mass from which there is isolated a polymer having a composition corresponding to an ethylene/formaldehyde mole ratio of 29 to 1 and melting at 99° to 100° C. The polymer is thermosetting.

*Example X*

A glass pressure reaction vessel is charged with 20 parts of vinyl thiolacetate and 1 part of diethyl dioxide under a blanket of nitrogen to exclude atmospheric oxygen. The vessel is closed and held at 100° C. for 16 hours. Upon cooling and opening the reactor there is isolated from the reaction mixture a colorless, hard, polymeric material having an intrinsic viscosity of 1.114 (0.5% solution in chloroform at 25° C.).

*Example XI*

An emulsion consisting of 100 parts of water, 90 parts of vinyl acetate and 2 parts of 80% hydrolyzed polyvinyl acetate is placed in a stainless steel reaction vessel. The reaction mixture is stirred and heated under nitrogen while 0.5 part diethyl dioxide dissolved in 10 parts of vinyl acetate is added slowly. The emulsion is heated for 5 hours at 65° C. and finally steam distilled to remove residual monomeric materials. From the reaction mixture there is obtained 17 parts of a solid polymer having a molecular weight of 48,000 and a tensile strength of 8700 lbs./sq.in. (measured on a hot pressed film).

*Example XII*

A stainless steel lined reaction vessel is charged with 100 parts of tertiary-butyl alcohol, 20 parts of N-vinyl-phthalimide, and 0.3 part of diethyl dioxide. The vessel is closed, evacuated, placed in a heated shaker machine, pressured with ethylene and heating and agitation started. During a reaction time of 16.5 hours, throughout which the temperature is maintained at 120° to 130° C. and the pressure at 760 to 955 atmospheres, there is a total observed pressure drop of 180 atmospheres. At the end of this time, the vessel is cooled, the excess ethylene bled off and the contents discharged. The crude reaction mixture, amounting to 105 parts is steam distilled to separate the tertiary-butyl alcohol and volatilize the major portion of the N-vinylphthalimide. There is thus obtained 22 parts of a strong elastomer of ethylene and N-vinylphthalimide containing 4.4% nitrogen from which it may be calculated that the ethylene/N-vinylphthalimide mole ratio is 5.3 to 1. The polymer is soluble in tetrachloroethylene and xylene to the extent of 10%, soluble in hot butyl acetate, relatively insoluble in cold butyl acetate, and insoluble in formamide. Films pressed at 95° to 100° C. have a tensile strength of 1530 lbs./sq. in. and an elongation at break of 380%.

*Example XIII*

A stainless steel lined reaction vessel is charged approximately two-fifths full with a solution of 0.5 part of dimethyl dioxide in 150 parts of distilled water. The vessel is closed, placed in a heated shaker machine, pressured with ethylene, and heating and agitation started. During a reaction time of 9½ hours, throughout which the temperature is raised slowly from 125° to 202° C., and the pressure maintained between 600 and 900 atmospheres by periodically repressuring with ethylene, there is a total observed pressure drop of 1025 atmospheres. At the end of this time, the vessel is cooled, the excess ethylene bled off and the contents of the reaction vessel discharged. There are thus obtained 75 parts of a tough, flexible ethylene polymer with a tensile strength of 1420 lbs./sq. in.

*Example XIV*

A stainless steel lined reaction vessel is charged approximately two-fifths full with 150 parts of deaerated, distilled water and 1 part of diethyl dioxide. The vessel is closed, placed in a heated shaker machine, pressured with ethylene, and heating and agitation started. During a reaction time of 9½ hours, throughout which the temperature is maintained at 118° to 130° C., and the pressure at 790 to 910 atmospheres, there is a total observed pressure drop of 945 atmospheres. The vessel is then cooled, the excess ethylene is bled off, and the contents of the vessel discharged. There are thus obtained 61 parts of a white, tough ethylene polymer with a tensile strength of 2500 lbs./sq. in.

*Example XV*

Through a tubular, stainless steel reaction vessel $\tfrac{3}{16}''$ I. D. × 34' in length are passed 1000 cc./hr. of deaerated, distilled water containing 0.2% of diethyl dioxide and 1% of borax together with ethylene at 1000 atmospheres pressure. The reaction vessel is immersed in liquid, the temperature of which is maintained at 165° to 170° C. The product is continuously discharged into an atmospheric pressure separator, from which the exit gas is continuously discharged through a meter, and from which solid and liquid are removed periodically, by means of a "letdown" valve between reaction vessel and separator, which valve is so adjusted as to maintain the exit gas rate at about 15 cu. ft./hr. (measured at room temperature and pressure). In six hours of such operation there are obtained 2640 parts of white, solid ethylene polymer which is a conversion of 50% of the ethylene charged to solid polymer. This polymer is tough and flexible, can be cold drawn, and has a tensile strength of 1100 lbs./sq. in. based on the original dimensions of the test sample.

*Example XVI*

The process of Example XV is duplicated except that the concentration of diethyl dioxide catalyst in the aqueous phase is decreased from 0.2% to 0.008%. In five hours of such operation there are obtained 579 parts of white, solid polymer—a conversion of 21% of the ethylene charged to solid polymer. This polymer has a tensile strength of 1660 lbs./sq. in.

*Example XVII*

The process of Example XVI is duplicated, except that benzene is also pumped through the reaction vessel with the aqueous solution of diethyl dioxide and borax and the ethylene, at a rate of approximately 250 cc./hr. In six hours of such operation there are obtained 690 parts of solid ethylene polymer, similar to that of Example XVI, but with an even higher tensile strength, 2075 lbs./sq. in. Twenty per cent of the ethylene charged is converted to solid polymer in this type of operation.

The optimum temperature for the present process varies considerably with the nature of the material polymerized. Temperatures in excess of 200° C. are generally not employed because under such conditions the diethyl dioxide decomposes rapidly, and at temperatures below 60° C. polymerization is too slow for practical purposes. The practical operating temperature range for the dialkyl dioxides is from about 65° to 200° C.

The present catalysts are effective for the polymerization of organic compounds containing at least one polymer producing unsaturated linkage, and they are particularly valuable for polymerizing ethylene itself at temperatures in the range of 130° to 180° C.

By "organic compound containing at least one polymer producing linkage" is meant compounds containing the ethylenic linkage, $=C=C=$ and compounds containing carbon-oxygen unsaturation, e. g., aldehydes, carbon monoxide, ketones, etc. As specific examples of compounds containing ethylenic unsaturation may be cited ethylene, propylene, vinylidene chloride, isobutylene, butadiene-1,3, isoprene, 2-chloro-butadiene-1,3, maleic anhydride, maleic and fumaric acid esters, vinyl esters, ethers, and ketones, vinyl thiolesters, acrylic and methacrylic acids and their esters, amides, and nitriles, N-vinylamides, e. g., N-vinylmaleimide, N-vinylsuccinimide, N-vinylphthalimide, etc., styrene, limonene, carboxylic acid esters of unsaturated alcohols, etc.

The catalysts of this invention show particular utility in the preparation of polymers of two or more organic compounds each having at least one polymer producing unsaturated linkage, e. g., in the polymerization of ethylene with another organic compound containing a polymer producing unsaturated linkage, e. g., vinyl acetate, vinyl chloride, methacrylic acid esters, vinyl thiolacetate, etc.

The dialkyl dioxide can be used at practically any pressure depending on the requirement of the compound being polymerized.

Although the purity of reactants is not critical to operativeness, it is preferable to use reagents as pure as is commercially feasible. In general the process is operated under conditions such that the molecular oxygen content of the system, based upon the organic compound to be polymerized, such as ethylene, for example, is less than 1000 parts per million, under 200 parts per million being preferred and under 20 parts per million giving attractive products.

The process can be operated at pressures ranging from atmospheric to 3000 atmospheres and above, depending upon the compound being polymerized, in the case of ethylene it being preferred to use superatmospheric pressures of the order of 200 atmospheres and above.

As many apparently widely different embodiments of this invention may be made without departing from the spirit and scope thereof, it is to be understood that I do not limit myself to the specific embodiments thereof except as defined in the appended claims.

I claim:

1. The process for polymerizing ethylene which comprises heating ethylene in the presence of a catalyst comprising a dialkyl dioxide of the formula ROOR' in which R and R' are simple unsubstituted alkyl groups, containing not more than three carbon atoms.

2. The process for polymerizing ethylene which comprises heating ethylene at a temperature at 60° to 200° C. in the presence of a catalyst comprising a dialkyl dioxide of the formula ROOR' in which R and R' are simple unsubstituted alkyl groups, containing not more than three carbon atoms.

3. The process for polymerizing ethylene which comprises heating ethylene in the presence of a catalyst comprising a dialkyl dioxide of the formula ROOR' in which R and R' are simple unsubstituted alkyl groups containing not more than three carbon atoms, the reaction being carried out at a pressure above 200 atmospheres.

4. The process for polymerizing ethylene which comprises heating ethylene in the presence of diethyl dioxide at a temperature of 60° to 200° C. under a pressure above 200 atmospheres.

5. The process for polymerizing ethylene which comprises heating ethylene in the presence of diethyl dioxide and water at a temperature of 60° to 200° C. under a pressure above 200 atmospheres.

6. A process for obtaining polymeric materials which comprises reacting a mixture of ethylene and another organic compound under reaction conditions which comprise heating said mixture in the presence of a catalyst comprising a dialkyl dioxide of the formula ROOR', in which R and R' are simple unsubstituted alkyl groups containing not more than three carbon atoms at a temperature of 60° to 200° C. and under a pressure above 200 atmospheres, said other organic compound being copolymerizable with ethylene under said reaction conditions.

7. The process set forth in claim 6 in which said organic compound is vinyl chloride.

8. The process set forth in claim 6 in which said organic compound is vinyl acetate.

9. The process of claim 6 in which said organic compound is methyl methacrylate.

MERLIN D. PETERSON.